United States Patent
Taylor (10) Patent No.: US 10,220,353 B2
(45) Date of Patent: Mar. 5, 2019

(54) FILTER WATER MANAGEMENT USING HYDROPHILIC MATERIAL

(71) Applicant: Robert Warren Taylor, Ponte Vedra Beach, FL (US)

(72) Inventor: Robert Warren Taylor, Ponte Vedra Beach, FL (US)

(73) Assignee: BHA Altair, LLC, Franklin, TN (US)

( * ) Notice: Subject to any disclaimer, the term of this patent is extended or adjusted under 35 U.S.C. 154(b) by 725 days.

(21) Appl. No.: 14/471,077

(22) Filed: Aug. 28, 2014

(65) Prior Publication Data

US 2016/0061158 A1 Mar. 3, 2016

(51) Int. Cl.
| | | |
|---|---|---|
| *B01D 61/14* | (2006.01) | |
| *B01D 71/48* | (2006.01) | |
| *F02C 7/05* | (2006.01) | |
| *F02M 35/08* | (2006.01) | |
| *B01D 71/36* | (2006.01) | |
| *B01D 69/10* | (2006.01) | |

(52) U.S. Cl.
CPC ............... *B01D 71/48* (2013.01); *F02C 7/05* (2013.01); *B01D 61/14* (2013.01); *B01D 69/10* (2013.01); *B01D 71/36* (2013.01); *B01D 2239/0421* (2013.01); *B01D 2239/0428* (2013.01); *B01D 2325/38* (2013.01); *F02M 35/086* (2013.01)

(58) Field of Classification Search
CPC ........ B01D 39/04; B01D 39/06; B01D 67/02; B01D 67/125; B01D 61/14; B01D 69/10; B01D 71/36; B01D 71/48; B01D 2239/0421; B01D 2239/0428; B01D 2325/38
USPC ............................................................. 96/11
See application file for complete search history.

(56) References Cited

U.S. PATENT DOCUMENTS

| | | | |
|---|---|---|---|
| 6,511,927 B1 * | 1/2003 | Ellis .................... | A41D 13/1209 442/394 |
| 8,328,895 B2 | 12/2012 | Nicholas | |
| 8,409,448 B2 * | 4/2013 | Chase .................. | B01D 17/045 210/505 |
| 2011/0083419 A1 | 4/2011 | Upadhyay et al. | |
| 2011/0265434 A1 | 11/2011 | Polizzi et al. | |
| 2013/0232932 A1 * | 9/2013 | Jarrier ....................... | F02C 7/05 55/483 |
| 2015/0165385 A1 * | 6/2015 | Oh ......................... | B01D 69/12 261/6 |

FOREIGN PATENT DOCUMENTS

| | | |
|---|---|---|
| EP | 2 692 410 A1 | 2/2014 |
| WO | WO 96/14913 | 5/1996 |
| WO | WO9614913 * | 5/1996 |

* cited by examiner

*Primary Examiner* — Frank M Lawrence, Jr.
(74) *Attorney, Agent, or Firm* — Reinhart Boerner Van Deuren P.C.

(57) ABSTRACT

A media comprising a hydrophobic media layer and a hydrophilic matrix applied to one face of the hydrophobic media layer is provided. The media may be incorporated into a filter cartridge for an air filtration system for a gas turbine engine. The media may have the capability to wick droplets of water.

26 Claims, 4 Drawing Sheets

FILTER WATER MANAGEMENT USING HYDROPHILIC MATERIAL

FIELD OF THE INVENTION

This invention generally relates to filtration media, and more specifically to filtration media used in filter cartridges and air filtration systems.

BACKGROUND OF THE INVENTION

Filter media are used in a variety of applications. One such application for filtered media is in the filtration of fluids, including the filtration of gaseous fluids. Filter media may permit the flow of desired fluid components through the media while preventing the flow of undesired particulates. In this manner, only the desired fluid components proceed through the filtration media and through the filtration system.

Filtration systems are often used to filter the air flowing into combustion engines. One particular type of filtration system is used in conjunction with gas turbine engines. This type of filtration system may include filter cartridges that incorporate filter media in various shapes and configurations. Because the undesired particulate or other components build up on the upstream surface of the filter cartridges, the filter cartridges may be replaceable and may also incorporate features designed to extend the life span of the filter cartridges. One such feature is a back pulse mechanism.

BRIEF SUMMARY OF THE INVENTION

In one aspect, the invention provides a media comprising a hydrophobic media layer and a hydrophilic matrix. The hydrophobic media layer has opposed first and second faces. The hydrophilic matrix is along the first face of the hydrophobic media layer. The first face of the hydrophobic media layer has a first portion obstructed by the hydrophilic matrix and a second portion exposed through open areas defined by the hydrophilic matrix.

In an embodiment, the hydrophobic media layer comprises a porous membrane comprising at least one of ePTFE, PTFE, and stretched film filter media. The porous membrane has an average pore size of between 0.01 micron and 10 microns, and an air flow permeability of at least 0.1 CFM measured per ASTM D737.

In an embodiment, the hydrophobic media layer comprises a porous fibrous entanglement comprising fibers formed from at least one of polyolefin, polyamide, polyester, polysulfone, polyether, acrylic, methacrylic, polystyrene, polyurethane, polypropylene, polyethylene, expanded polytetrafluoroethylene (ePTFE), Woven PTFE, and non-Woven PTFE. The porous fibrous entanglement has an average pore size of between 0.01 microns and 10 microns, and an air flow permeability of at least 0.1 CFM measured per ASTM D737.

In an embodiment, the open areas comprise greater than 50%, such that greater than 50% of the first face of the hydrophobic media layer is exposed.

In an embodiment, the open areas comprise greater than 75%, such that greater than 75% of the first face of the hydrophobic media layer is exposed.

In an embodiment, the hydrophilic matrix only obstructs between 5% and 15% of the first face of the hydrophobic media layer.

In an embodiment, the hydrophilic matrix comprises a plurality of continuous or discontinuous strips, each of the plurality of strips having a width of between 0.05 and 2 millimeters, a length longer than the width, and a depth thickness of between 0.05 and 2 millimeters.

In an embodiment, the hydrophilic matrix comprises a plurality of continuous or discontinuous strips, each of the plurality of strips spanning an entire width and length span of the media.

In an embodiment, the media is a filter media. The hydrophobic media layer has an average pore size of between 0.01 microns and 10 microns an air flow permeability of at least 0.1 CFM measured per ASTM D737, an air flow capacity of approximately 3 to 10 CFM at 0.5 inch of water gauge pressure drop, and having an initial filtration efficiency of at least 99.0% for 0.3 micron sized aerosol particles measured by ASTM D6830.

In an embodiment, the hydrophilic matrix comprises a chemical deposition imprint of a chemical deposition imprint of at least one of any suitable amine-containing hydrophilic polymer such as polyvinyl alcohol-coamine polymers.

In an embodiment, a permanent hydrophilic treatment is imparted to the hydrophilic matrix by employing a cross-linking polymer.

In an embodiment, the hydrophilic matrix comprises a deposition of fibers. The deposition of fibers comprises fibers of polyactides or other polymers with hydrophilic coatings.

In an embodiment, the fibers are entangled with the hydrophobic media layer along the first side of the hydrophobic media layer.

In one embodiment, the hydrophilic matrix creates less than 10% restriction to the hydrophobic media layer, measured over an air flow range of between 3 to 10 CFM at 0.5 inches of pressure drop.

In another aspect, the invention provides an air filtration system for a gas turbine engine (or other industrial application) comprising an air inlet housing assembly and a filter cartridge. The air inlet housing assembly is arranged upstream of the gas turbine engine and is arranged to filter combustion air flowing to the gas turbine engine. The filter cartridge is arranged in the air inlet housing assembly. The filter cartridge includes filter media. The filter media comprises a hydrophobic media layer and a hydrophilic matrix. The hydrophobic media layer has opposed first and second faces. The hydrophilic matrix is along the first face of the hydrophobic media layer. The first face of the hydrophobic media layer has a first portion obstructed by the hydrophilic matrix and a second portion exposed through the open areas defined by the hydrophilic matrix. The hydrophobic media layer has an average pore size between 0.01 microns and 10 microns, and an air flow permeability of at least 0.1 CFM measured per ASTM D737, an air flow capacity of approximately 3 to 10 CFM at 0.5 inch of water gauge pressure drop, and having an initial filtration efficiency of at least 99.0% for 0.3 micron sized aerosol particles measured by ASTM D6830.

In one embodiment, the air filtration system further comprises a back pulse arrangement arranged to pulse air through the filter cartridge to release dust.

In yet another aspect, the invention provides a method of operating the air filtration system for a gas turbine engine. The method comprises drawing air through the filter cartridge, the air being subject to periodic fog having droplets with an average droplet size of between about 1 and about 5 microns size in diameter and wicking away the droplets from pores in the hydrophobic media layer via the hydrophilic Another aspect is directed toward a media, comprising a hydrophobic filter media having opposed first and second faces, the hydrophobic filter media comprising at least one of a porous membrane and a porous non-woven porous fiber entanglement having an average pore size of between 0.01 microns and 10 microns and an air flow permeability of at least 0.1 CFM measured per ASTM D737; and a hydrophilic channels integral with by the hydrophobic filter media, the hydrophobic filter media having open areas defined between the hydrophilic channels, wherein air flow can pass through the open areas between the first and second faces without passing through the hydrophilic channels.

According to an embodiment, a hydrophobic filter media comprising at least one of ePTFE, PTFE, fluorine containing polymeric fibers, or other polymeric fibers with a hydrophobic treatment.

According to an embodiment, a second face of hydrophobic filter media is laminated to a carrier layer for structural support, the carrier layer alone providing greater support characteristics relative to the hydrophobic filter media alone, the carrier layer including an average fiber size at least 4 times larger in diameter than an average fiber or fibril size of the hydrophobic filter media, and/or an average pore size at least 4 time larger than the filter media.

According to an embodiment, the hydrophilic channels (also referred to herein as hydrophilic matrix) are formed or deposited upon the first face that forms an upstream face for the hydrophobic filter media.

According to an embodiment, the open areas comprise greater than 75%, such that greater than 75% of the air flow through the hydrophobic filter media can bypass the hydrophilic channels.

According to an embodiment, the hydrophilic channels may be strips that are continuous and extend primarily vertically to facilitate gravitational drainage.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Non-woven porous media such as PTFE or ePTFE is used, applied to or laminated on woven or non-woven substrates to improve particle removal efficiency. The non-woven top surface is by design comprised of multiple micro-pores that minimize passage of fine particles to the substrate. In practice, some environmental conditions such as extended periods of fog that range in water droplet size from 1 to 5 micron can cause the top layer to "blind" with water. When the blinding occurs, the internal micro-pores of the filter media become plugged and system pressure drop increases rapidly and dramatically that can result in potential equipment shut-down in an industrial process. For example, in air filtration applications to gas turbine engines, a fog event may cause a paid increase in pressure drop due to blinding with water or plugging of the micro-pores resulting in the gas turbine to be shut down and is readily undesirable.

Embodiments below describe the utilization of hydrophilic materials in conjunction with the microporous top layer to manage accumulation of water. Hydrophilic material can be printed upon the upstream porous media layer or otherwise deposited in some manner onto or inside the microporous top layer. As an alternative, separate fibers of hydrophilic material could be incorporated into the base material that comprise the top microporous layer.

The hydrophilic pattern will serve to transfer water occupying the pores of the microporous top layer, preventing blinding. Thus, the hydrophilic pattern provides hydrophilic channeling through which water can flow or aggregate. It is contemplated that the flow of water from the microporous layer would prevent water from fully occupying all of the pores to enable air to continue to flow through the microporous top layer at an acceptable rate to prevent or at least delay shutdown of an engine or gas turbine or other industrial process during an event such as from a extended periodic fog event that may be frequent and repetitive.

In accordance with certain aspects, the various embodiments discussed below or above include hydrophilic channels and/or a hydrophilic matrix that serves for water or other liquid accumulation to leave open areas of filter media through which air flow is contemplated to continue either indefinitely or for at least an extended time period to prevent premature clogging or blinding off.

This is contemplated to be particularly advantageous when filtering outdoor air which is subject to weather conditions such as periodic fog events that may last for several hours. Further, over the course of a day or among days, weather events can change leading to drier air that can then dry out the hydrophilic matrix or hydrophilic channels and other portions of the filter media to thereby regenerate the filter media for the next event.

The selection of the base material for constructing a filter media depends in large part on the intended use of the resulting filter. If the resulting filter is to be used in an air filtration system, then it is desirable to select a filter media base material that is gas permeable while partially or fully excluding the flow of solid particulate matter and liquids. Examples of materials that are appropriate for use as a hydrophobic base layer for the filter media include but are not limited to polytetrafluoroethylene, also known as PTFE, manufactured by DuPont™ or others and extended polytetrafluoroethylene, also known as ePTFE, manufactured by BHA Altair LLC (a/k/a Clarcor Industrial) or by W. L. Gore & Associates, Inc. or others.

Other appropriate materials for the hydrophobic base layer include polymer materials including fluorine or other hydrophobic treatments or other fibers that are naturally hydrophobic.

Membranes and other filter medias typically do not exhibit a uniform distribution of pore location and size, but rather are characterized by having average pore sizes and porosity, properties that are controlled by the method of forming the polymer into the filter media substrate layer. Selection of an appropriate material for use in the substrate layer is a balance between two concerns: a larger average pore size and greater porosity allows through a higher percentage of microparticles resulting in a lower filtration efficiency, while a smaller average pore size and lower porosity obstructs a higher percentage of the microparticles resulting in a higher filtration efficiency. However, a filter that obstructs a higher percentage of microparticles necessarily retains those microparticles, resulting in an increased rate of accumulation of dust or debris on the upstream side of the filter media. A filter media that accumulates dust too quickly on the upstream side will develop a pressure drop too quickly; as a result, the filtration device incorporating the filter media must be replaced more frequently. The selection of a material for use as the substrate layer of the media must accommodate the twin desires for high filtration efficiency and long lifespan of the filtration device.

In various preferred embodiments, the polymer media will typically have an average pore size of between 0.01 microns and 10 microns, and an air flow permeability of at least 0.1 CFM measured per ASTM D737. The average pore size of the media selected for use in the filtration device will affect the permeability of the filter media and the filtration device.

having an initial filtration efficiency of at least 99.0% for 0.3 micron sized aerosol particles measured by ASTM D6830, and wherein the hydrophilic matrix creates less than a 10% restriction to the hydrophobic media layer, measured through an air flow range of between 3 to 10 CFM at 0.5 inches of pressure drop.

Based on similar considerations, in a preferred embodiment for many of the typical applications contemplated, the material selected for the substrate layer of the filter media will have a minimum initial filtration efficiency of 99% for 0.3 sized particles as measured by the ASTM D6830 Standard Test Method for characterizing the Filtration Performance of Cleanable Filter Media.

Because of the filtration effects of the accumulated microparticles on the upstream side of the filter media, the filtration efficiency will increase over the lifespan of the filter media. The accumulation of microparticles will also increase the pressure drop of the filtration device over time. In a preferred embodiment, the media has a relatively low pressure drop with an air flow capacity of approximately 3 to 10 CFM at 0.5 inch of water gauge pressure drop.

The accumulation of microparticles on the upstream side of the filter media is not the only cause of an increase in the pressure drop over the life of the filtration device. The pressure drop is also affected by the capture of undesirable fluid components within the pores of the filter media. Unlike undesirable fluid components that simply accumulate on the upstream side of the filter media, microparticles and liquids that are captured within the pores of the filter media cannot be removed through means such as a back pulse mechanism or manually brushed away. As such, the captured microparticles and liquids pose a greater problem to the overall utility of the filtration device than the accumulated microparticles on the upstream side of the filter media.

In addition to the aforementioned partial solution of including a back pulse mechanism such as the one disclosed in U.S. application Ser. No. 12/576,566, the materials of the filter media may be selected and arranged in such a way as to prevent some of the capture of liquids that leads to an accelerated increase in the pressure drop of the filtration device. Although the primary embodiments in this application conceptualize liquids as water and water based solutions, this disclosure is in no way limited to those types of liquids and may specifically be applied to the problem of filter media capture of non-polar solvent liquids such as toluene, hexane, etc. and the problem of filter media capture of petrochemicals including but not limited to olefins. Regardless of the type of liquid, the problem of filter media capture of liquid droplets can be addressed by the proper selection and arrangement of materials for the filter media. The anticipated environment for the filtration device and the expected types of liquids with which the filtration device comes into contact will affect whether the materials selected for inclusion in the filter media should have hydrophilic, lipophilic, oleophilic, or other similar properties.

The filter media disclosed herein incorporates a partial hydrophilic coating on hydrophobic media to attract and direct the movement of droplets of water or other polar liquids that come into contact with the filter media. For droplets of other types of liquids, e.g. non-polar solvents or petrochemicals, the substrate can be oleophobic or lipophobic and the coating can be oleophilic or lipophilic. In this way, the coating attracts the droplets and, with the assistance of gravity and other external forces, directs the droplets away from the pores in which the droplets could otherwise become lodged. If the droplets of liquids were captured by the pores of the filter media, the droplets could become lodged in the pores due to phenomena such as capillary action and weak inter-molecular forces, such as van der Waals forces. The filter media disclosed herein incorporates a partial coating to attract liquid droplets and prevent them from entering the pores of the filter media, thereby preventing the increase of the pressure drop of the filtration device due to liquid droplet capture.

Figure 1:
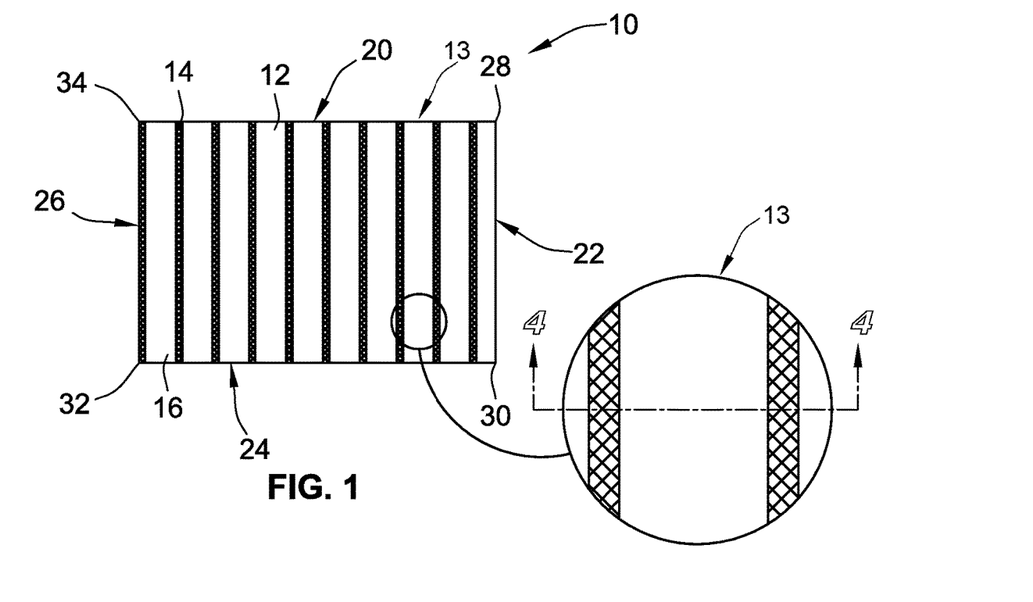
FIG. 1 is a front view of a media showing both the substrate and the matrix according to an exemplary embodiment.

FIG. 1 shows one exemplary embodiment of the filter media disclosed in this application. The sheet of media 10 is comprised of a hydrophobic media layer 12 overlaid with a hydrophilic matrix 14. In FIG. 1, the hydrophobic media layer 12 is shown as the white material, while the hydrophilic matrix 14 is shown as the hatched strips that run vertically across the hydrophobic media layer 12. The hydrophobic media layer 12 extends across the sheet of media 10, but has two distinct portions: the first portion is obscured or covered by the hydrophilic matrix 14 while the second portion 13 consists of those open or exposed areas 13 of hydrophobic media layer 12 that can be seen around and between the strips of hydrophilic matrix 14.

One way of describing FIG. 1 is that the hydrophobic media layer 12 has a first side 16 and a second side (not shown here), and that the first and second sides of the hydrophobic media layer are opposite to and parallel with each other. The parallel sides of the hydrophobic media layer may be described as follows: where the first side 16 defines a first plane and the second side defines a second plane, the first and second planes of the hydrophobic media layer do not intersect within the body of the filter media, but rather extend to and reach an undefined number of edges of the sheet of media 10. These edges of the sheet of media 10 are not part of either of the planes defined by the sides of the hydrophobic media layer 12.

Preferably the first side 16 that has the hydrophilic matrix 14 is the upstream side relative to fluid flow when arranged on a filter element in a fluid circuit. That way the hydrophilic matrix can interact with water droplets sooner prior to becoming trapped or contained in the depth of the media.

The hydrophilic matrix may also alternatively be on the second side (i.e. the downstream side) with no matrix on the upstream side in another embodiment. Further, the matrix 14 may also be on both upstream and downstream sides 14, 16 in a further embodiment.

There are four edges to the sheet of filter media shown in FIG. 1; in other embodiments, there may be more edges or as few as a single edge in the case of a filter media cut in the shape of a circle. The edges of the sheet of filter media may be neatly cut, cut in a predefined or arbitrary pattern, or torn raggedly. The number or position of edges of the sheet of filter media should not affect the functioning of the filter media so long as the fluid that flows through the filter media cannot flow around the edges of the filter media.

In FIG. 1, there is a first edge 20, a second edge 22, a third edge 24, and a fourth edge 26. All four edges are substantially even and appear as straight lines. The first edge 20 and the third edge 24 are substantially parallel to each other, and the second edge 22 and the fourth edge 26 are substantially parallel to each other. The first edge 20 and the second edge 22 join at a first corner 28; the second edge 22 and the third edge 24 join at a second corner 30; the third edge 24 and the fourth edge 26 join at a third corner 32; and the fourth edge 26 and the first edge 20 join at a fourth corner 34. As shown in FIG. 1, the portions of the hydrophobic media layer 12 directly adjacent to the corners of the sheet of filter media 10 may or may not be covered with the hydrophilic matrix 14. The portion of the hydrophobic media layer 12 directly adjacent to the first corner 28 is not covered with the hydrophilic matrix 14, while the portion of the hydrophobic media layer 12 directly adjacent to the third corner 32 is covered with the hydrophilic matrix 14. In preferred embodiments, the presence of the hydrophilic matrix 14 is neither necessary for nor prohibitive of fastening the corners and edges of the sheet of filter media 10 into a filter cartridge or other filter housing.

In a preferred embodiment, the downstream or second side of the hydrophobic media layer 12 that is not visible in FIG. 1 does not have a hydrophilic matrix similar to the visible hydrophilic matrix 14.

In a preferred embodiment, the side of the hydrophobic media layer 12 that is not visible in FIG. 1 may be affixed to or laminated on a woven or non-woven fabric scrim, such as such in later embodiments. If the scrim is a non-woven fabric scrim, it may be constructed out of either felted or spun fibers that lack a predetermined pattern when examined under a microscope.

In one preferred embodiment, the fabric scrim is made from woven fiberglass; in another embodiment, the fabric scrim is made from needlefelted synthetic fibers such as polypropylene or polyester. Regardless of whether the fabric scrim is woven or non-woven, the function of the fabric scrim is to provide structural support to the hydrophobic media layer 12 and help the hydrophobic media layer 12 resist mechanical forces that could lead to rupture or tear of the sheet of media 10.

In certain embodiments, the fabric scrim does not contribute to the overall filtration efficiency of the sheet of media 10. The carrier support scrim typically provides most of the support but has little measurable effect on the efficiency, flow capacity, restriction or other filtration parameters of the overall laminated composite. Neither the hydrophobic media layer 12 nor the hydrophilic matrix 14 provide any significant structural support that would allow the sheet of media 10 to retain shape against gravitational forces or against the forces generated by a flow of fluid at a high velocity.

In other embodiments, the side of the hydrophobic media layer 12 that is not visible in FIG. 1 may be completely or partially covered with some other matrix designed to have some other effect on the function of the media. In these other embodiments, the matrix on the side of the hydrophobic media layer 12 not visible in FIG. 1 may be applied in the same pattern or design as the hydrophilic matrix 14 on the visible side of the hydrophobic media layer 12 in FIG. 1 or it may be applied in a different pattern or design based on the intended purpose or known effect of the other matrix. In one embodiment, the matrix on the side of the hydrophobic media layer 12 not visible in FIG. 1 may be an adhesive; in one embodiment, the matrix of adhesive applied to the side of the hydrophobic media layer 12 not visible in FIG. 1 may be applied to the second side of the hydrophobic media layer 12 adjacent to the edges of the hydrophobic media layer 12. In another embodiment of the invention, the matrix on the side of the hydrophobic media layer 12 not seen in FIG. 1 may be a gel or other substance designed to cool the air that has permeated through the filter media.

In the exemplary embodiment shown in FIG. 1, the hydrophilic matrix 14 covers less than approximately 50% of the surface area of the visible side of the hydrophobic media layer 12. In this context, the use of the word "approximately" denotes a margin of +1-2%. The optimal percentage of surface area covered by the hydrophilic matrix 14 will depend on the composition of the hydrophilic matrix 14, the composition of the hydrophobic media layer 12, and the constraints of the environment in which the filtration device is designed to operate. The preferred embodiment of the filter media disclosed herein has a hydrophilic matrix 14 that covers less than approximately 10% of the surface area of the visible side of the hydrophobic media layer 12. In similar embodiments, the hydrophilic matrix 14 covers between 5% and 15% of the surface area. In another embodiment, the hydrophilic matrix 14 covers less than approximately 25% of the visible side of the hydrophobic media layer 12. In other embodiments, the hydrophilic matrix 14 covers between approximately 10% and approximately 50% of the visible side of the hydrophobic media layer 12. As with the selection of an appropriate substrate material, the determination of the amount of surface area of the hydrophobic media layer 12 that must be covered by the hydrophilic matrix 14 depends on a number of factors all related to the desired application for the filtration device that incorporates the media shown in FIG. 1.

Although the hydrophilic matrix 14 prevents or wicks away the capture of liquid droplets by the pores of the hydrophobic media layer 12, a filter completely covered in the hydrophilic matrix 14 would not be ideal. Certain preferred embodiments of the filter media disclosed in this application use PTFE and ePTFE in part because of their gas permeability and structural flexibility, as well as their resilience against chemical degradation and abrasive wear over time. In preferred embodiments of the filtration device disclosed herein, the application of the hydrophilic matrix 14 over only a limited portion the hydrophobic media layer 12 will not significantly change the beneficial properties of the underlying substrate material. Consequently, a smaller percentage of the surface area of the first side 16 of the hydrophobic media layer 12 covered by the hydrophilic matrix 14 will be less likely to adversely affect the properties of underlying substrate material that made the material an attractive choice for inclusion in a filter media. However, this concern about adversely affecting the beneficial properties of the substrate material must be weighed against the need to prevent the capture of liquid droplets in the pores of the filter media.

One additional distinction should be made regarding the surface area covered by the hydrophilic matrix 14. In FIG. 1, the pattern defined by the hydrophilic matrix 14 and the open areas 13 of the hydrophobic media layer 12 revealed in the places where there is no matrix is shown as continuous, alternating strips. This is only one embodiment, and other patterns for the application of the hydrophilic matrix may work better under different environmental conditions. In particular, where the composition of the liquid droplets is not water based, but instead may include petrochemicals with different viscosities, the pattern of the hydrophilic matrix 14 may differ. In some embodiments to be used in less humid conditions, the pattern of the hydrophilic matrix 14 may not be uniform, symmetrical, or even extend across the full length or width of the filter media. Alternate patterns for the application of the hydrophilic matrix are discussed further with regard to FIG. 5.

Figure 2:
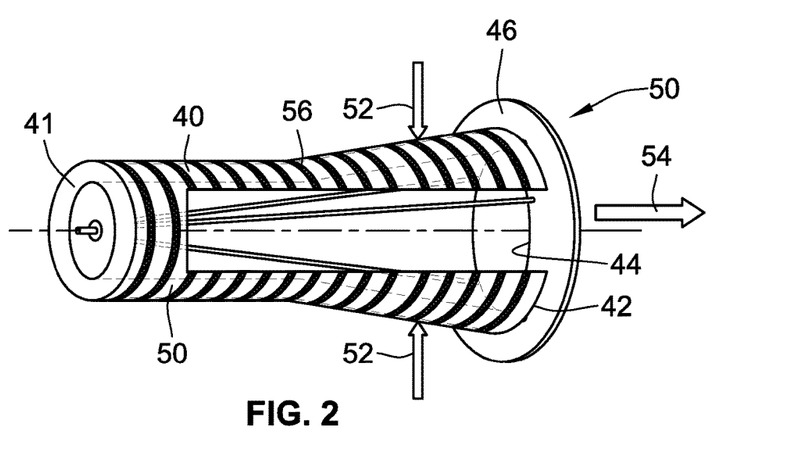
FIG. 2 is a cut-away perspective and partly schematic view of a cartridge filer including the media of FIG. 1 according to an exemplary embodiment.

In FIG. 2, the filter media is shown in an exemplary filtration device, shown here as a filter cartridge 50. The filter cartridge 50 shown in FIG. 2 is a conical filter cartridge, but other shapes may be equally possible or even preferred based on the application for the filtration device. Possible filters may take the form of but are not limited to cones, pleated panel filters, other pleated filters, bags, candles, stacked filters, or wraparound shaped filters. Because of the conical shape of the filter cartridge 50, the upstream side of the sheet of media 10 is on the outside of the filter cartridge 50.

In this disclosure, the terms "upstream" and "downstream" generally indicate a direction relative to the flow of fluid through an air filtration system towards a gas turbine engine or other industrial application. The direction of the upstream unfiltered air flow is shown with the incoming arrow 52, while the direction of the downstream filtered air flow is shown with the outgoing arrow 54. Generally, air flow is radially inward through the filter media and then the filtered air exits axially through opening 44 and corresponding flow opening in tubesheet 46.

In FIG. 2, which is partially schematic, the sheet of media 10 is in a pleated ring 40 (pleats not shown) that has an opposed closed end cap 41 and an open end cap 42 with central opening 44. The filter cartridge 50 is mounted on a tube sheet 46 that may be employed in a gas turbine filtration system (see e.g. FIG. 3). The tube sheet arrangement has a tripod support 56 that provides structure for mechanical mounting of the filter cartridge. Similar physical supports are described in U.S. application Ser. No. 12/770,126.

As is clear from the location of the hydrophilic matrix 14 on the outside of the filter cartridge 50, the filtration device disclosed herein is formed from a sheet of media 10 that is prepared with the hydrophilic matrix 14 in advance of being incorporated into a filter cartridge 50.

In some embodiments the method of applying the hydrophilic matrix 14 onto the sheet of media 10 may be done after the sheet of media 10 is pleated into the filter cartridge 50 and may be advantageous in some circumstances.

In FIG. 2, the orientation of the sheet of media 10 is such that longitudinal extensions of strips of the hydrophilic matrix 14 is not substantially parallel to the central axis defined by the cylindrical section of the filter cartridge 50. In this context, the phrase "not substantially parallel to" means that the strips of hydrophilic matrix 14 are greater than 30° past the central axis.

This is one embodiment of the orientation of the strips of hydrophilic matrix 14; other orientations are possible as well. Given the horizontal orientation of the central axis, the hydrophilic matrix 14 is also not substantially parallel to the horizontal plane including the central axis. This non-substantially horizontal orientation of the hydrophilic matrix 14 is important because it allows for a synergistic combination of the force of gravity and the hydrophilic properties of the matrix material.

With this non-substantially horizontal orientation, the liquid droplets may be wicked away from the pores in the exposed areas of the hydrophobic media layer 12 and gravitationally drained to provide open region sufficiently free of liquid droplets to avoid undue pressure drop or loss of air flow. Some water may collect in between the pleats on the upper side and might drip off along the bottom side of the filter. The non-substantially horizontal orientation of the strips of hydrophilic matrix 14 allow the liquid droplets on the strips of hydrophilic matrix 14 to be overcome by gravity and roll down along the paths of the strips of the hydrophilic matrix 14. While on the hydrophilic matrix 14, the liquid droplets may also coalesce into larger drops, so that the weights of the coalesced drops overcome the forces maintaining the drops' vertical positions.

Based on the details described above, the hydrophilic matrix 14 may function in up to at least three different ways: first, it wicks the liquid droplets away from the pores of the hydrophobic media material, thereby clearing those pores of some of the undesired fluid components and reducing the total surface area of the sheet of media 10 that experiences accumulation and possible capture of liquid droplets. Second, by concentrating the liquid droplets in small areas of the total surface of the sheet of material, the liquid droplets are more likely to join together into larger drops that are overcome by the force of gravity. In this way, the hydrophilic matrix acts as a coalescer that facilitates the consolidation and possible removal of undesired liquid. Third, the hydrophilic matrix provides a continuous or, in other embodiments, non-continuous, path along the sheet of material along which liquid droplets may traverse that facilitates the removal of the liquid droplets from the accumulated undesired fluid components and slows the rate of the increase of the pressure drop. In this manner, it may concentrate the water to leave larger open operating regions limiting the plugging to smaller regions.

Figure 3:
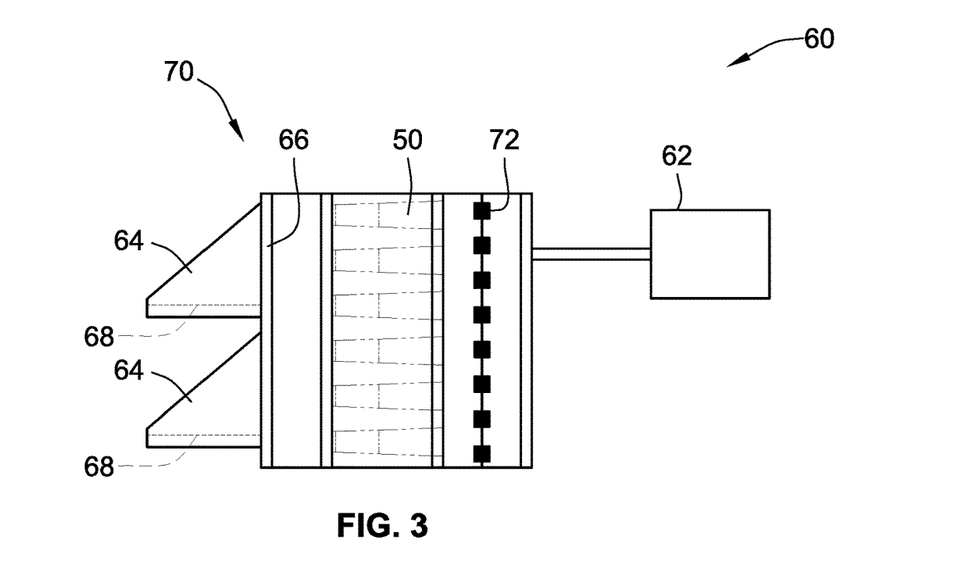
FIG. 3 is a schematic side elevation view of an air filtration system including the cartridge filter of FIG. 2 according to an exemplary embodiment.

In FIG. 3, the filter cartridge 50 is incorporated into one embodiment of an air filtration system 60 for a gas turbine engine 62. A description of a similar air filtration system that does not include the disclosed filter media with a hydrophilic matrix 14 and hydrophobic media layer 12 is given in U.S. application Ser. No. 13/417,358. The air filtration system includes louvers 64 over the entrance ducts 66 into the air filtration system 60. The louvers 64 may include their own filters, shown here as flat panel or V-bank filters 68, that may incorporate different filtration technology and serve a different filtering purpose, or that could be the subject of and employ the filter media 12.

The entrance ducts 66 and a region containing a plurality of filter cartridges 50 together comprise the air inlet housing assembly 70. The region containing the plurality of filter cartridges 50 is arranged in the air filtration system 60 so that the flow of fluid, in this case combustion air, through the air filtration system 60 to the gas turbine engine 62 must pass through the sheets of media 10 assembled into the filter cartridges 50. The air filtration system 60 is airtight in that fluid cannot reach the gas turbine engine 62 without progressing through the first side 16 of the sheet of media 10 that removes the undesired fluid components. As discussed previously, one embodiment of the air filtration system may include one or more back pulse mechanisms 72 designed to periodically dislodge microparticles and liquid droplets that have accumulated on the sheet of material 10.

Once the fluid progresses past the filter cartridge 50 of the air filter system 60, the fluid should be free of particles greater than 0.3 microns in size (e.g. at least 99% efficient). If particles of this size exist in the filtered fluid, then the sheet of filter media 10 has possibly been torn or ruptured and requires replacement. Alternatively, if the filtration device is not installed correctly, then particles of this size may circumvent the filtration device and progress through the air filtration system 60 and reach the gas turbine engine 62. However, in a properly installed and properly maintained air filtration system 60, the filtered fluid will generally not contain particles greater than 0.3 microns in size.

Figure 4:
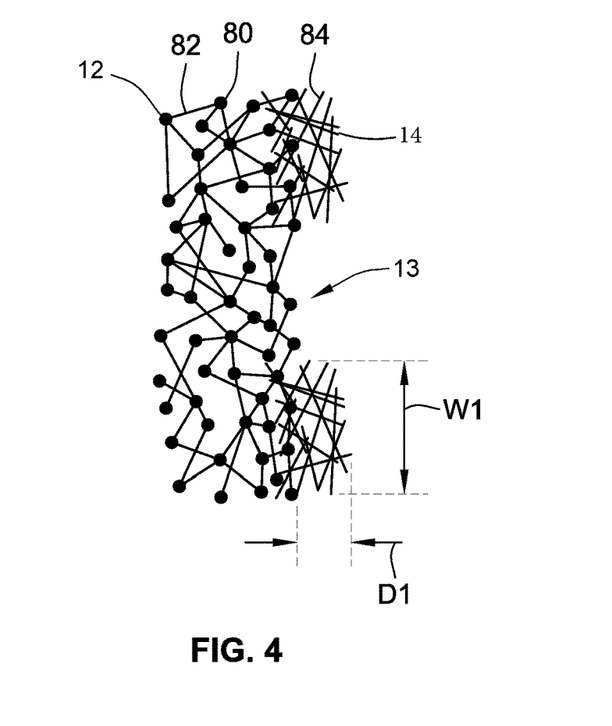
FIG. 4 is an enlarged schematic and demonstrative close-up cross-sectional side view of the media from FIG. 1 showing both the substrate and the matrix according to an exemplary embodiment, taken along line 4-4 in FIG. 1.

In FIG. 4, the schematic structure of an embodiment of the hydrophilic matrix 14 and the hydrophobic media layer 12 can be seen more clearly. This view shows the nodules 80 and the fibrils 82 of the ePTFE material that serves as the material for they hydrophobic media layer 12 in a preferred embodiment. In this embodiment, the hydrophobic media layer 12 is a porous fibrous entanglement; however, in other embodiments the hydrophobic media layer 12 may be one or more sheets of a porous membrane.

FIG. 4 also shows alternating strips of the hydrophilic matrix 14, in this embodiment. Depending on the composition of the hydrophilic material, the dimensions of the strips 84 of the hydrophilic matrix 14 may vary. In the embodiment shown in FIG. 4, the strips 84 of the hydrophilic matrix 14 have a width W1 of between 0.05 and 2 millimeters. These widths may apply to any of the other FIGS. or embodiments discussed herein. A material that is more hydrophilic or that is applied to a filter media operating in an environment with lower humidity (or less fog) may have thinner strips 84 of the hydrophilic matrix 14.

In the embodiment shown in FIG. 4, the strips 84 of the hydrophilic matrix 14 have a depth thickness D1 of between 0.05 and 2 millimeters. This depth thickness D1 is measured from the plane containing the outermost fibers of the hydrophilic matrix 14 to the plane containing the outermost fibers of the hydrophobic media 12, although in some embodiments there may exist a fibrous entanglement between the hydrophilic matrix 14 and the hydrophobic media layer 12 in which some of the fibers of the hydrophilic matrix 14 extend into the hydrophobic media layer 12. The depth thickness D1 does not include those fibers of the hydrophilic matrix 14 that extend beyond the plane containing the outermost fibers of the hydrophobic media layer 12. The depth thickness D1 of the strips 84 of the hydrophilic matrix 14 may depend on the resistance of the material of the hydrophilic matrix 14 to abrasive decomposition, as a material that abrades off the filter media more quickly will have to be applied more thickly. This is especially true for filter media operating in air filtration systems in the Arabian Peninsula, the Gulf Coast of the United States, or other similarly harsh conditions.

Traditional air filtration systems filter out solid particulate matter in mild environmental conditions relatively effectively. Modern innovations have allowed for air filtration systems that also filter solid microparticles measured a micron or submicron in diameter. However, liquid droplets of a similar size pose additional challenges to air filtration systems. Because of capillary action and individually weak but cumulatively effective intermolecular forces, if liquid droplets of a certain size make their way into the pores of the filter media, the liquid droplets cannot be dislodged through mechanical means such as being brushed away or pulsed free from the pores. Instead, if liquid droplets are lodged in a high enough percentage of the pores of the filter media, the air filtration system must be brought offline and the filtration device replaced or dried out.

Periodic fog events in the Arabian Peninsula involve water droplets of this size; the water droplets are approximately 1 to 5 microns in diameter. These water droplets can blind, or temporarily disable, the air filtration systems due to a rapid increase in pressure drop. Air filtration systems in other environments may experience similar problems with naturally occurring water droplets of varying sizes, such as the sea humidity in the Gulf Coast of the United States. In environments such as these—the Arabian Peninsula and the Gulf Coast—periodic fog events and humidity are not the only challenges faced by air filtration systems. The air filtration systems improvements designed to alleviate the problems of liquid droplets must also withstand the high temperatures, abrasion by sand, and other severe environmental conditions faced by outdoors air filtration systems in these environments. Consequently, the dimensions, compositions, and other characteristics of the strips 84 of hydrophilic matrix 14 and the hydrophobic media layer 12 may be optimized to the anticipated challenges of a particular environment.

It is an advantage in the case of periodic fog events that last on the order of hours typically, that the hydrophilic strips may aggregate water and extend operating time. Further, after the fog event, drier air from the external environment will be run through the filters drying out aggregated water on the hydrophilic strips and regenerating the media for the next fog event.

Figure 5:
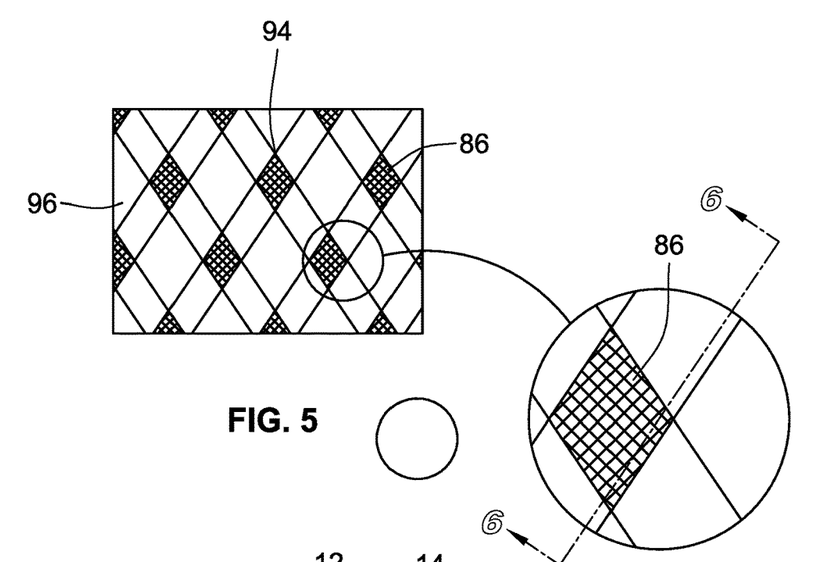
FIG. 5 is a front view of a media showing both the substrate and the matrix according to another exemplary embodiment.

In FIG. 5, another embodiment of a pattern for the hydrophilic matrix 14 is shown. In this pattern, there are non-continuous strips of hydrophilic matrix 14, shown here as diamonds 86, although lines are shown to indicate that continuous strips could be applied to generate a continuous crisscross pattern. Although the diamonds 86 of the hydrophilic matrix 14 may cover the same percentage of the total surface area of the first side 16 of the sheet of media 10 as the strips 86 of the hydrophilic matrix 14 of FIG. 1, the pattern is different.

When the pattern or strips are continuous, it may be especially useful for filter media that can be incorporated into a filtration device without regard to the orientation of the filter media; by having a crisscross pattern (see e.g. FIG. 8), the pattern of the hydrophilic matrix 14 will retain the ability to facilitate the draining of liquid droplets and liquid drops without regard to which way the filter media is rotated within the filtration device and without regard to which way the filtration device is oriented in relation to the ground. Alternatively, this pattern may be used in filtration devices incorporating pleated filter media.

Further, the diamonds 86 need not contact each other in an embodiment as shown in FIG. 5. Although drainage away from the media is not obtained, aggregation of water is contemplated to be accomplished on the diamond areas 86 (and occupied regions 94) while leaving open regions 96 drier areas for air flow.

Other possible embodiments include but are not limited to a chevron pattern for the hydrophilic matrix 14, a pattern of repeating circles or intersecting concentric circles for the hydrophilic matrix 14, or an application of the hydrophilic matrix 14 to the surface of the first side 16 of the hydrophobic media layer 12 in such a way that the pattern resembles a plaid or gingham style design.

Figure 6:
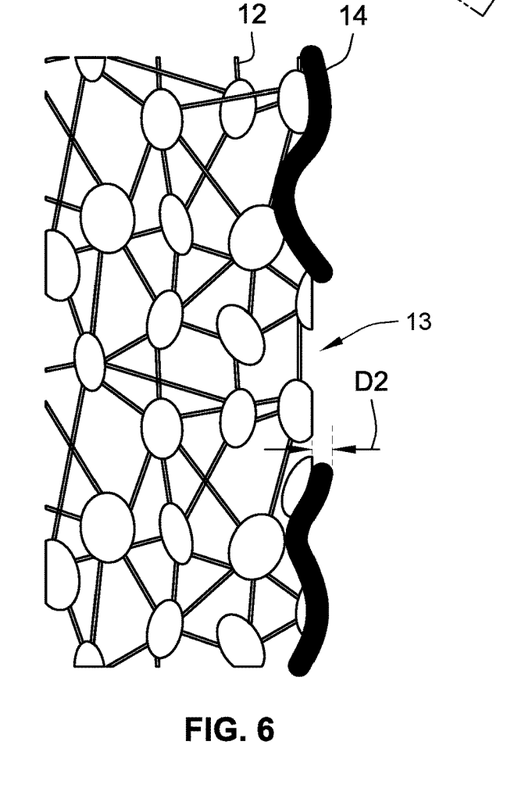
FIG. 6 is an enlarged schematic and demonstrative cross-sectional side view of the media from FIG. 5 showing both the substrate and the matrix according to an exemplary embodiment, taken along line 6-6 in FIG. 1.

In FIG. 6, one embodiment of the cross-section of the filter media from FIG. 5 is shown. In contrast to the filter media of FIG. 4, this cross-section shows a hydrophilic matrix 14 that was applied by chemical deposition. This embodiment of the filter media shows an embodiment in which only the hydrophobic media layer 12 is fibrous, and the hydrophilic matrix 14 takes some other form. The hydrophilic matrix 14 in this embodiment has a second depth thickness D2; the second depth thickness D2 shown in FIG. 6 is thinner than the first depth thickness D1 shown in FIG. 4, a reduction in material facilitated by the alternate means of applying the hydrophilic matrix 14. As previously discussed, the physical integrity of the filter media is not derived from the materials of either the hydrophobic media layer 12 or the hydrophilic matrix 14 and so the depth thickness of the hydrophobic matrix 14 should not substantially affect the physical integrity of the filter media.

Figure 7:
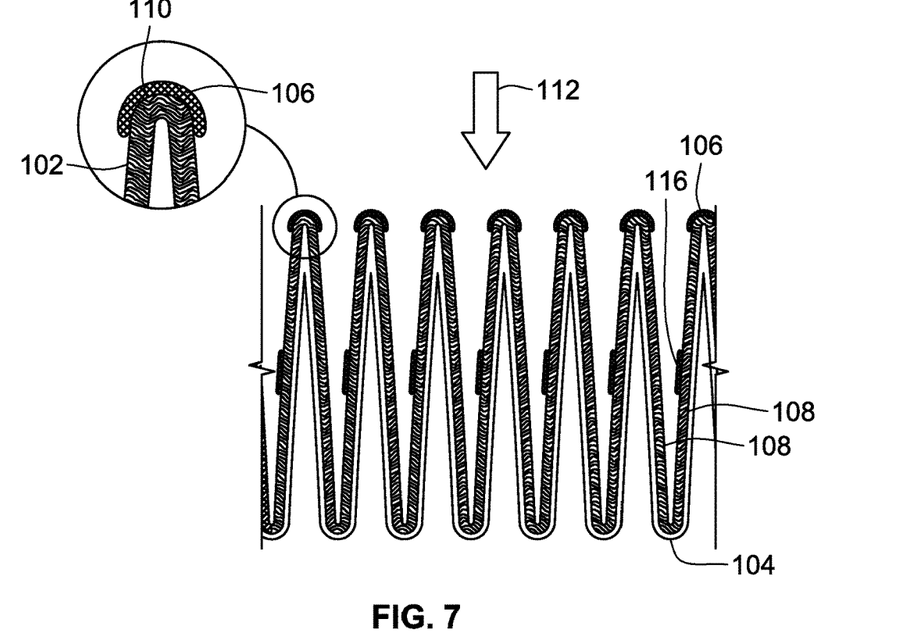
FIG. 7 is a cross-section illustration of a filter media according to another embodiment.

Turning to FIG. 7, a further embodiment of a filter media 100 is shown that includes a hydrophobic filter media layer 102 laminated to a carrier substrate support layer 104. Further, a hydrophilic matrix in the form of continuous strips 106 is applied only to the pleat tips along the upstream face of hydrophobic filter media 102. Specifically, the overall media 100 is pleated to include pleats 108 with the hydrophilic strips 106 disposed only on the pleat tips 110 that may be applied after pleating.

The direction of air flow is shown at 112 indicating that the strips 106 are disposed along the upstream surface.

Further, the strips 106 may longitudinally run vertically (e.g. the cross-section taken horizontally through media) to facilitate gravitational drainage.

This embodiment also shows that the carrier layer 104 in better detail provides the structural support and pleatibility for the overall filter media structure. This same carrier layer can be applied to the other embodiments discussed herein. Other parameters, materials and description used for the embodiments may be also used for this embodiment and applicable thereto.

Further, additional hydrophilic matrix in the form of vertically extending strips 116 may also be applied along the pleat flanks 108 in addition or in the alternative to those along the pleat tips. These may not need to be at regular intervals as shown and may be at different locations along the pleat flanks and may be applied prior to pleating. An embodiment may include either or both strips 116, 116.

The media of FIG. 7 may be used in a panel filter (including a V-bank filter) or be coiled into a ring and employed for example in annular filter element as shown for example in FIG. 2.

Figure 8:
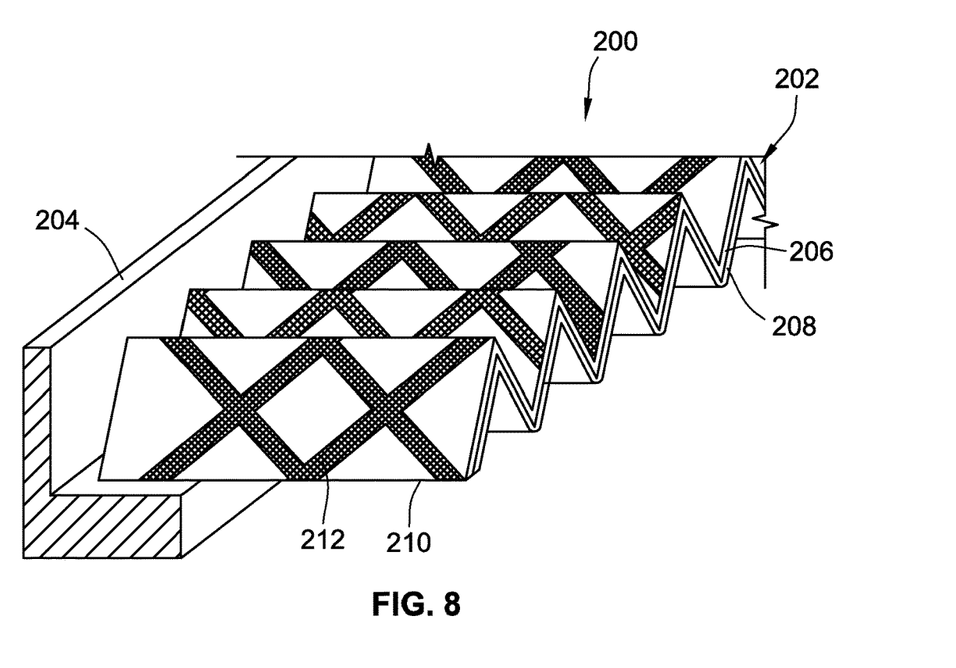
FIG. 8 is a perspective view of a panel filter employing media according to yet another embodiment. The panel filter may be employed as is or as part of multiple panel filters as in a V-bank arrangement (for V-bank filter configurations usable in an embodiment, see e.g. BHA Altair U.S. Pat. No. 8,328,895 to Nicholas, the entire disclosed of which is hereby incorporated by reference).

Turning to FIG. 8 yet a further embodiment is shown in the form of a panel filter 200 including a filter media 202 disposed in a rectangular border frame 204 (only a portion of the frame 204 being shown). A panel filter is typically a generally planar member that includes a rectangular border frame in which the pleated filter media 202 is supported and contained. This embodiment also includes a carrier support layer 208 that is laminated to and provides structural support for the hydrophobic filter media layer 206. As noted earlier and as is in the case of earlier embodiments, the fiber size of the coarse layer may be four times more or even much greater than the fiber size or fiber of the hydrophobic filter media layer. The hydrophobic filter media layer 206 is arranged on the upstream surface of the support layer 208. Additionally the hydrophilic matrix takes the form of crisscross strips 210, 212 that intersect each other and extend over and along the upstream face of the hydrophobic filter media 206. Regardless of how the panel filter 200 is oriented, at least some of the strips 210 and 212 will extend vertically sufficient to facilitate gravitational drainage toward one end of the panel filter when in use. These panel filters may also be employed in the gas turbine system and application shown above as may the other embodiments discussed above.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any nonclaimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An apparatus comprising a filter comprising media, the media comprising:
    a hydrophobic media layer having opposed first and second faces,
    a hydrophilic matrix along the first face of the hydrophobic media, the first face of the hydrophobic media having a first portion obstructed by the hydrophilic matrix and a second portion exposed through open areas defined by the hydrophilic matrix.

2. The apparatus of claim 1, wherein the hydrophobic media comprises a porous membrane comprising at least one of ePTFE, PTFE, and stretched film filter media, the membrane having an average pore size of between 0.01 microns and 10 microns, and an air flow permeability of at least 0.1 CFM measured per ASTM D737.

3. The apparatus of claim 1, wherein the hydrophobic media comprises a porous fibrous entanglement comprising fibers formed from at least one of polyolefin, polyamide, polyester, polysulfone, polyether, acrylic, methacrylic, polystyrene, polyurethane, polypropylene, polyethylene, expanded polytetrafluoroethylene (ePTFE), Woven PTFE, and non-Woven PTFE, the porous fibrous entanglement having an average pore size of between 0.01 microns and 10 microns, and an air flow permeability of at least 0.1 CFM measured per ASTM D737.

4. The apparatus of claim 1, wherein the open areas comprise greater than 50%, such that greater than 50% of the first face of the hydrophobic media is exposed.

5. The apparatus of claim 1, wherein the open areas comprise greater than 75%, such that greater than 75% of the first face of the hydrophobic media is exposed.

6. The apparatus of claim 1, wherein the hydrophilic matrix only obstructs between 5% and 15% of the first face of the hydrophobic media.

7. The apparatus of claim 1, wherein the hydrophilic matrix comprises a plurality of continuous or discontinuous strips, each of the plurality of strips having a width of between 0.05 and 2 millimeters, a length longer than the width, and a depth thickness of between 0.05 and 2 millimeters.

8. The apparatus of claim 1, wherein the hydrophilic matrix comprises a plurality of continuous or discontinuous strips, each of the plurality of strips spanning an entire width and length span of the media.

9. The apparatus of claim 1, wherein the hydrophobic media has an average pore size of between 0.01 microns and 10 microns, an air flow permeability of at least 0.1 CFM measured per ASTM D737, an air flow capacity of approximately 3 to 10 CFM at 0.5 inch of water gauge pressure drop, and having an initial filtration efficiency of at least 99.0% for 0.3 micron sized aerosol particles measured by ASTM D6830.

10. The apparatus of claim 1, wherein the hydrophilic matrix comprising a chemical deposition imprint of at least one of an amine-containing hydrophilic polymer.

11. The apparatus of claim 1, wherein a permanent hydrophilic treatment is imparted to the hydrophilic matrix employing a cross-linking polymer.

12. The apparatus of claim 1, wherein the hydrophilic matrix comprises deposition of fibers comprising fibers of polyactides or other polymers with hydrophilic coatings.

13. The apparatus of claim 12, wherein the fibers are entangled with the hydrophobic media layer along the first side of the hydrophobic media layer.

14. The apparatus of claim 1, wherein the hydrophilic matrix creates less than a 10% restriction to the hydrophobic media layer, measured through an air flow range of between 3 to 10 CFM at 0.5 inches of pressure drop.

15. An air filtration system for a gas turbine engine or industrial application, including the apparatus of claim 1, the system comprising:
    an air inlet housing assembly arranged upstream of the gas turbine engine or industrial application, arranged to filter combustion air flowing to the gas turbine engine or industrial application;
    wherein the filter is a filter cartridge arranged in the air inlet housing assembly;
    wherein the hydrophobic media layer has an average pore size of between 0.01 microns and 10 microns, and an air flow permeability of at least 0.1 CFM measured per ASTM D737, an air flow capacity of approximately 3 to 10 CFM at 0.5 inch of water gauge pressure drop, and having an initial filtration efficiency of at least 99.0% for 0.3 micron sized aerosol particles measured by ASTM D6830.

16. The air filtration system of claim 15, further comprising a back pulse arrangement arranged to pulse air through the filter cartridge to release dust.

17. A method of operating the air filtration system for a gas turbine engine or industrial application of claim 15, comprising:
    drawing air through the filter cartridge, the air being subject to periodic extended periods of fog having water droplets with an average droplet size of between about 1 and about 5 microns size in diameter;
    wicking away the water droplets from pores in the hydrophobic media layer via the hydrophilic matrix.

18. The apparatus of claim 10, wherein the amine-containing hydrophilic polymer comprises a polyvinyl alcohol-coamine polymer.

19. The apparatus according to claim 1, wherein:
    the hydrophobic media layer comprises at least one of a porous membrane and a porous woven or non-woven fiber entanglement having an average pore size of between 0.01 microns and 10 microns and an air flow permeability of at least 0.1 CFM measured per ASTM D737; and
    the hydrophilic matrix comprises hydrophilic channels integral with the hydrophobic media layer, the open areas defined between the hydrophilic channels, wherein air flow can pass through the open areas between the first and second faces without passing through the hydrophilic channels.

20. The apparatus of claim 19, wherein the hydrophobic media layer comprises at least one of ePTFE, PTFE, fluorine containing polymeric fibers, or polymeric fibers with a hydrophobic treatment.

21. The apparatus of claim 19, wherein the second face of the hydrophobic media layer is laminated to a carrier layer for structural support, the carrier layer alone providing greater support characteristics relative to the hydrophobic media layer alone, the carrier layer including an average fiber size at least 4 times larger in diameter than an average fiber or fibril size of the hydrophobic media layer and an average pore size at least 4 times larger than the filter media.

22. The apparatus of claim 21, wherein the hydrophilic channels are formed or deposited upon the first face that forms an upstream face for the hydrophobic media layer.

23. The apparatus of claim 19, wherein the open areas comprise greater than 75%, such that greater than 75% of the air flow through the hydrophobic filter media can bypass the hydrophilic channels.

24. The apparatus of claim 19, wherein the hydrophilic channels comprises a plurality of continuous or discontinuous strips, each of the plurality of strips having a width of between 0.05 and 2 millimeters, a length longer than the width, and a depth thickness of between 0.05 and 2 millimeters.

25. The apparatus of claim 24, wherein the strips are continuous and extend primarily vertically to facilitate gravitational drainage.

26. The apparatus of claim 19, wherein the hydrophobic media layer includes an air flow capacity of approximately 3 to 10 CFM at 0.5 inch of water gauge pressure drop, and having an initial filtration efficiency of at least 99.0% for 0.3 micron sized aerosol particles measured by ASTM D6830, and wherein the hydrophilic channels create less than a 10% restriction to the hydrophobic media layer, measured through an air flow range of between 3 to 10 CFM at 0.5 inches of pressure drop.

* * * * *